United States Patent
Kihara et al.

(10) Patent No.: US 7,443,064 B2
(45) Date of Patent: Oct. 28, 2008

(54) PERMANENT-MAGNET GENERATOR HAVING PROTRUSIONS FOR DISSIPATING HEAT

(75) Inventors: Nobuhiro Kihara, Tokyo (JP); Kaoru Imaizumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/357,169

(22) Filed: Feb. 21, 2006

(65) Prior Publication Data

US 2007/0024142 A1   Feb. 1, 2007

(30) Foreign Application Priority Data

Jul. 29, 2005   (JP)   ............... 2005-219877

(51) Int. Cl.
*H02K 9/00* (2006.01)
*H02K 9/06* (2006.01)
*H02K 21/22* (2006.01)

(52) U.S. Cl. ............... 310/60 A; 310/60 R; 310/61; 310/64; 310/74

(58) Field of Classification Search ........... 310/67 R, 310/60 A, 60 R, 61, 64, 74, 58
See application file for complete search history.

(56) References Cited

U.S. PATENT DOCUMENTS

| | | | | |
|---|---|---|---|---|
| 4,418,296 A | * | 11/1983 | Ebentheuer et al. | 310/70 R |
| 4,701,654 A | * | 10/1987 | Tatukawa et al. | 310/153 |
| 5,051,638 A | * | 9/1991 | Pyles | 310/105 |
| 6,429,564 B1 | * | 8/2002 | Uemura et al. | 310/153 |
| 6,534,880 B1 | * | 3/2003 | Sone et al. | 290/1 R |
| 6,815,849 B2 | * | 11/2004 | Serizawa et al. | 310/62 |
| 6,836,036 B2 | * | 12/2004 | Dube | 310/64 |
| 7,145,274 B2 | * | 12/2006 | Uemura et al. | 310/74 |
| 2002/0033647 A1 | * | 3/2002 | Uemura et al. | 310/156.12 |
| 2002/0179069 A1 | * | 12/2002 | Kobayashi | 123/647 |
| 2003/0222520 A1 | * | 12/2003 | Yokota | 310/63 |
| 2004/0164628 A1 | * | 8/2004 | Serizawa et al. | 310/61 |
| 2005/0104459 A1 | * | 5/2005 | Jones | 310/63 |
| 2005/0140232 A1 | * | 6/2005 | Lee et al. | 310/156.26 |
| 2005/0236916 A1 | * | 10/2005 | Uemura et al. | 310/58 |
| 2006/0076842 A1 | * | 4/2006 | Park | 310/62 |

FOREIGN PATENT DOCUMENTS

| | | | |
|---|---|---|---|
| JP | 57206260 A | * | 12/1982 |
| JP | 62-48152 | | 3/1987 |
| JP | 3038781 U | | 4/1997 |
| JP | 11098795 A | * | 4/1999 |
| JP | 2001-128429 | | 5/2001 |

(Continued)

OTHER PUBLICATIONS

Japanese Office Action dated Mar. 18, 2008.

*Primary Examiner*—Tran Nguyen
(74) *Attorney, Agent, or Firm*—Sughrue Mion, PLLC (57) ABSTRACT

A permanent-magnet generator includes a flywheel having a ringlike portion and a bottom portion which closes off one end of the ringlike portion and a plurality of protrusions bulging inward from the bottom portion of the flywheel. An irregular surface portion is formed in each of the protrusions for producing turbulence when the flywheel rotates, the irregular surface portion being irregularly shaped in section along a circumferential direction of the flywheel.

8 Claims, 6 Drawing Sheets

FOREIGN PATENT DOCUMENTS

| | | | | |
|---|---|---|---|---|
| JP | 2001136720 A | * | 5/2001 | |
| JP | 2001-157429 | | 6/2001 | |
| JP | 2002-101630 A | | 4/2002 | |
| JP | 2002101630 A | * | 4/2002 | |
| JP | 2003-9441 A | | 1/2003 | |
| JP | 2003009441 A | * | 1/2003 | |
| JP | 2006020494 A | * | 1/2006 | |

* cited by examiner

PERMANENT-MAGNET GENERATOR HAVING PROTRUSIONS FOR DISSIPATING HEAT

BACKGROUND OF THE INVENTION

1. Field of the Invention

The present invention relates to a permanent-magnet generator for producing electric power by virtue of electromagnetic induction caused by relative movement of magnets and electricity-generating coils due to rotation of a flywheel.

2. Description of the Background Art

As an example, a conventionally known permanent-magnet generator is configured such that a plurality of air passages are formed in a bottom portion of a generally cup-shaped flywheel with fins projecting inward from an outer ringlike portion of the flywheel, each fin being located between one air passage and another, to achieve an improved ventilating efficiency inside the flywheel. This kind of permanent-magnet generator is found in Japanese Patent Application Publication No. 2002-101630, for example. When the permanent-magnet generator is in operation, the fins rotate together with the flywheel, creating negative pressure around each air passage, whereby fresh outside air is introduced into the generator to replace inside air.

As in the aforementioned example of the prior art, conventional permanent-magnet generators are often provided with fins for introducing outside air and discharging inside air through air passages from an internal space of a flywheel. If a one-way clutch or the like is fitted to the bottom portion of the flywheel, however, part or all of the air passages might be blocked, leading to a problem that the interior of the permanent-magnet generator is not well ventilated with the aid of the air passages. Should such a situation occur, heat which builds up inside the generator will not be dissipated enough because the fins provided in the conventional permanent-magnet generator can not sufficiently stir up hot inside air.

In addition, as a result of recent tendency, toward higher output power of permanent-magnet generators and a higher frequency due to an increase in the number of magnetic poles produced by magnets and a core, temperature produced by heat buildup in electricity-generating coils is increasing. This temperature increase develops such problems as a decrease in service life and reliability of insulating coating and deterioration of generator efficiency. Under such circumstances, there is a growing demand for a permanent-magnet generator which can ventilate an internal space of a flywheel.

SUMMARY OF THE INVENTION

The present invention is intended to resolve the aforementioned problems of the prior art. Specifically, it is an object of the invention to provide a permanent-magnet generator which can efficiently dissipate heat from within a rotating flywheel, ventilate an internal space of the flywheel, offer increased service life and reliability of insulating coating and prevent deterioration of electricity-generating efficiency with a simple structure.

In one principal feature of the invention, a permanent-magnet generator includes a flywheel having a ringlike portion and a bottom portion which closes off one end of the ringlike portion, a plurality of magnets arranged on an inside surface of the ringlike portion of the flywheel, a plurality of protrusions bulging inward from the bottom portion of the flywheel, and a plurality of coils disposed to face the magnets for generating electricity by virtue of electromagnetic induction caused by relative movement of the coils and the magnets. An irregular surface portion is formed in each of the protrusions for producing turbulence when the flywheel rotates, the irregular surface portion being irregularly shaped along a circumferential direction of the flywheel.

In the permanent-magnet generator of the invention thus structured, the irregular surface portion formed in each of the protrusions creates turbulence around the protrusions when the permanent-magnet generator is operated. As a result, the protrusions sufficiently stir up air inside the flywheel and ventilate an internal space thereof in an efficient way.

These and other objects, features and advantages of the invention will become more apparent upon reading the following detailed description along with the accompanying drawings.

DESCRIPTION OF THE PREFERRED EMBODIMENTS

The invention is now described in detail with reference to specific embodiments thereof.

First Embodiment

Figures 1A, 1B:
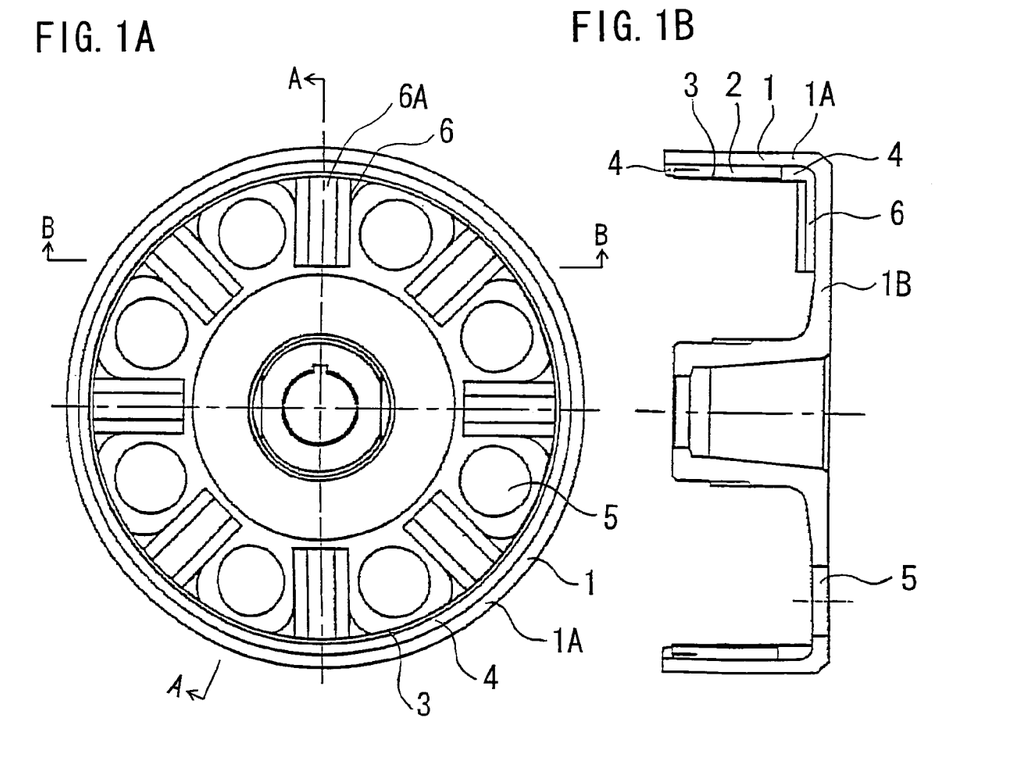
FIG. 1A is a front view of a rotor of a permanent-magnet generator according to a first embodiment of the invention.
FIG. 1B is a cross-sectional view of the rotor taken along lines A-A of FIG. 1A.
Figure 1C:
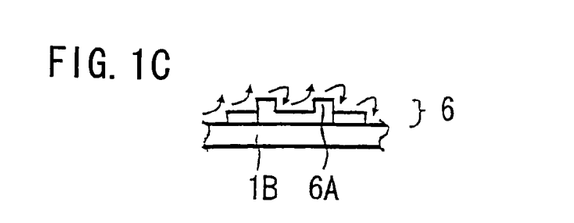
FIG. 1C is an enlarged fragmentary cross-sectional view of the rotor taken along lines B-B of FIG. 1A especially showing one of protrusions.

FIG. 1A is a front view of a rotor of a permanent-magnet generator according to a first embodiment of the invention, FIG. 1B is a cross-sectional view of the rotor taken along lines A-A of FIG. 1A, and FIG. 1C is an enlarged fragmentary cross-sectional view of the rotor taken along lines B-B of FIG. 1A especially showing one of protrusions 6.

As shown in FIGS. 1A, 1B and 1C, the rotor of this permanent-magnet generator includes a generally cup-shaped flywheel 1 formed of an outer ringlike portion 1A and a bottom portion 1B which closes off one end of the ringlike portion 1A. Inside the ringlike portion 1A of the flywheel 1, there are provided a plurality of magnets 2 arranged along a circumferential direction of the ringlike portion 1A, and a cylindrical protective ring 3 is fitted on the inside of the magnets 2 in close contact therewith. Resin material is filled between the ringlike portion 1A of the flywheel 1 and the protective ring 3, as if embedding the magnets 2, to form a resin layer 4 fixing the multiple magnets 2 and the protective ring 3 to the flywheel 1. There are formed a plurality of air passages 5 in the bottom portion 1B of the flywheel 1 and a plurality of protrusions 6 made of the resin material bulging inward from the bottom portion 1B, each of the protrusions 6 being located between two adjacent air passages 5. There is formed a radially extending recess 6A having a U-shaped cross section in a top surface of each protrusion 6. The recesses 6A formed in the individual protrusions 6 constitute irregular surface portions for producing air turbulence when the flywheel 1 rotates. The plurality of protrusions 6 (including the recesses 6A) are formed as integral parts of the resin layer 4 fixing the multiple magnets 2 and the protective ring 3 to the flywheel 1.

Figure 2:
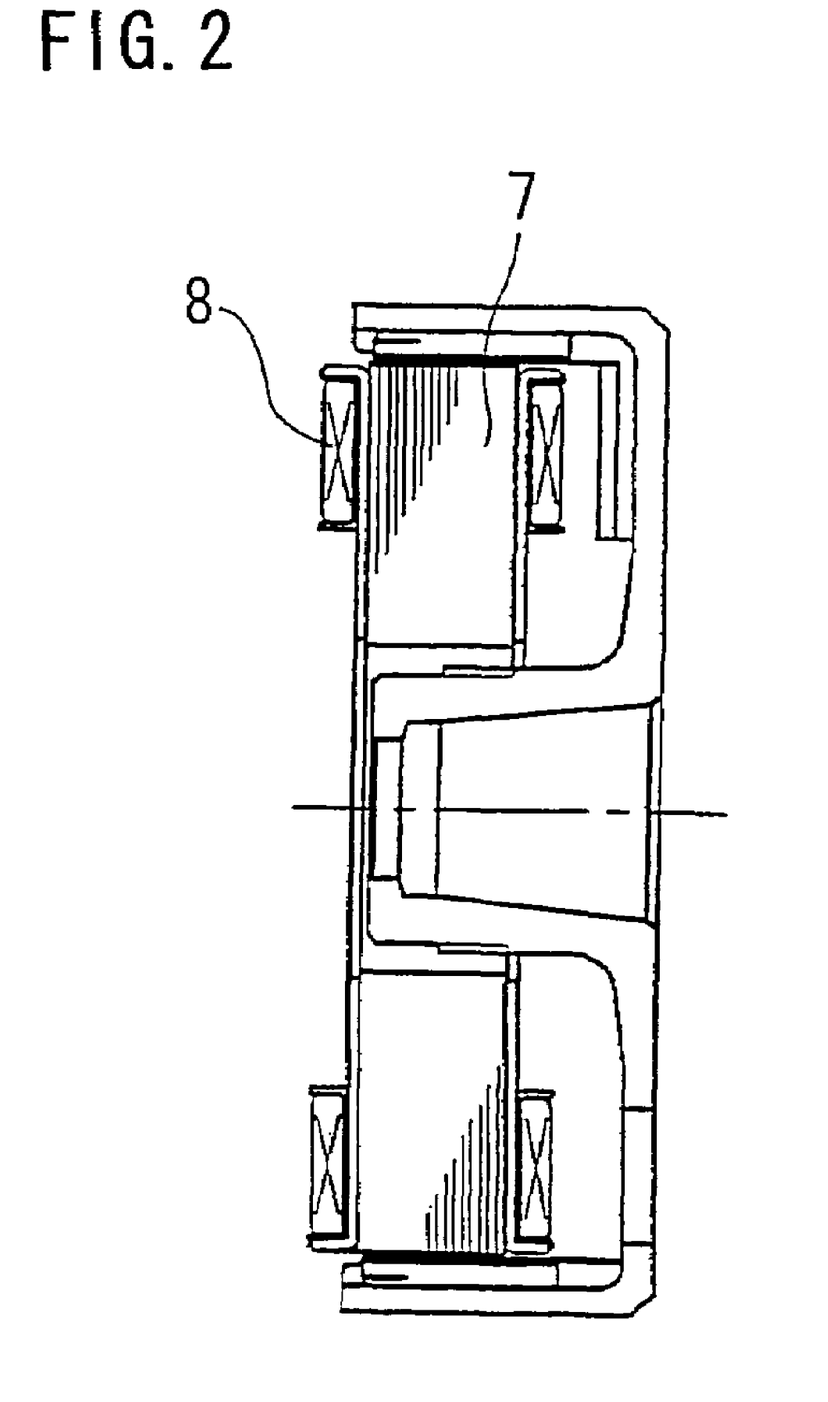
FIG. 2 is a cross-sectional view showing the rotor of FIG. 1B combined with a stator.

FIG. 2 is a cross-sectional view showing the rotor of FIG. 1B combined with a stator. The stator includes a laminated core 7 and electricity-generating coils 8 wound on the laminated core 7.

With the provision of the recesses 6A formed in the individual protrusions 6, turbulence is created in areas surrounding the protrusions 6 when the flywheel 1 rotates in the permanent-magnet generator of the present embodiment. Small arrows shown in FIG. 1C illustrate how the turbulence is created as a result of rotation of the flywheel 1. Since a plurality of disturbances in air flow, or local turbulences, are produced at multiple parts of each protrusion 6 as illustrated in FIG. 1C, the protrusions 6 can stir up air inside the flywheel 1 and ventilate an internal space thereof in an efficient way.

There is also created negative pressure around each air passage 5 behind each of the protrusions 6 with respect to a rotating direction of the flywheel 1. This negative pressure serves to forcibly introduce fresh outside air into the internal space of the flywheel 1 through the air passages 5.

Since local turbulences are produced at multiple parts of each protrusion 6 and the outside air is introduced through the air passages 5 by the negative pressure created by the protrusions 6 when the flywheel 1 rotates, air in the internal space of the flywheel 1 is efficiently stirred up by constant fluidic agitation in the permanent-magnet generator of this embodiment as discussed above. Therefore, the aforementioned structure of the permanent-magnet generator exerts a significantly improved cooling effect on the electricity-generating coils 8 when the flywheel 1 rotates.

Also, since the plurality of protrusions 6 are formed as integral parts of the resin layer 4 fixing the multiple magnets 2 and the protective ring 3 to the flywheel 1, there is no need for an additional process of separately forming protrusions in the manufacture of the permanent-magnet generator, and this serves to reduce manufacturing cost thereof.

Furthermore, as the recess 6A is formed in each of the protrusions 6, the individual protrusions 6 have portions of reduced thickness. Compared to a structure having no recesses in the protrusions, the aforementioned structure of the embodiment serves to accelerate cooling of the resin material during the manufacture of the permanent-magnet generator and improve moldability of the resin material.

Moreover, since the protrusions 6 are made of the resin material, the protrusions 6 can be formed into a desired shape with a larger degree of freedom compared to a structure in which metallic material is used for making the protrusions 6. Since each of the protrusions 6 has an irregular surface portion in the present embodiment as mentioned above, the aforementioned structure of the embodiment is particularly advantageous.

It is to be noted, however, that any material suited for molding and fixing the multiple magnets 2 and the protective ring 3 to the flywheel 1 may be used although the resin material is used in the present embodiment.

Even if part or all of the air passages 5 are blocked by a one-way clutch or the like fixed to the flywheel 1, for instance, the aforementioned structure of the embodiment exerts a significantly improved cooling effect on the electricity-generating coils 8 compared to a structure in which the protrusions 6 have no irregular surface portions for creating air turbulence. This is because the recesses (irregular surface portions) 6A formed in the individual protrusions 6 stir up air inside the flywheel 1 by producing local turbulences at multiple parts of each protrusion 6.

Figure 3:
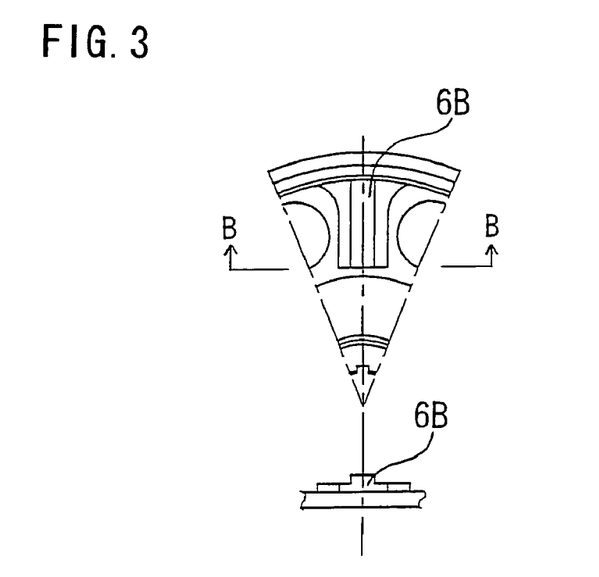
FIG. 3 shows a fragmentary front view and a fragmentary cross-sectional view taken along lines B-B of a rotor in one variation of the first embodiment.
Figure 4:
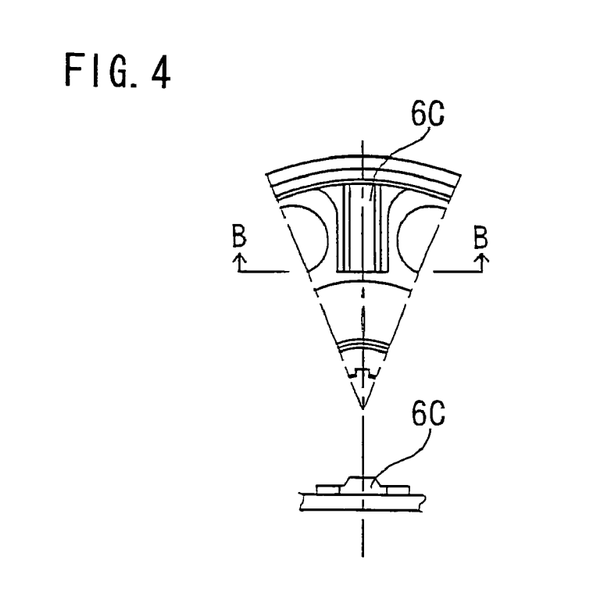
FIG. 4 shows a fragmentary front view and a fragmentary cross-sectional view taken along lines B-B of a rotor in another variation of the first embodiment.

While the irregular surface portion formed at the top of each protrusion 6 is a recess having a U-shaped cross section in the aforementioned structure of the embodiment, the same advantageous effect as mentioned above can be obtained with varied form of the irregular surface portions as illustrated in FIGS. 3 and 4.

FIG. 3 shows a fragmentary front view and a fragmentary cross-sectional view taken along lines B-B of a rotor in one variation of the first embodiment, in which a radially extending flat-topped projecting part 6B constituting an irregular surface portion having an inverted U-shaped cross section is formed at the top of each protrusion 6, and FIG. 4 shows a fragmentary front view and a fragmentary cross-sectional view taken along lines B-B of a rotor in another variation of the first embodiment, in which a radially extending flat-topped projecting part 6C constituting an irregular surface portion having slanted side surfaces is formed at the top of each protrusion 6. In either of these variations of the first embodiment, local turbulences are produced at multiple parts of each protrusion 6 when the flywheel 1 rotates, so that air in the internal space of the flywheel 1 is efficiently stirred up. These variations of the first embodiment also exert an improved cooling effect on the electricity-generating coils 8.

Since the flat-topped projecting part 6C formed on each of the protrusions 6 shown in FIG. 4 has slanted side surfaces, the projecting parts 6C have lower resistance to air flows produced as a result of rotation of the flywheel 1 compared to the projecting parts 6B of FIG. 3. Therefore, the projecting parts 6C of FIG. 4 can reduce energy loss occurring when the flywheel 1 rotates.

According to the invention, the irregular surface portion formed at the top of each protrusion 6 may a recess, a projecting part, or a combination of both, and the cross-sectional shape of each recess or projecting part may be rectangular, triangular or elliptical, for instance, as the irregular surface portions of any of these recesses and projecting parts can create local turbulences of air in the internal space of the rotating flywheel 1.

Second Embodiment

Figure 5A:
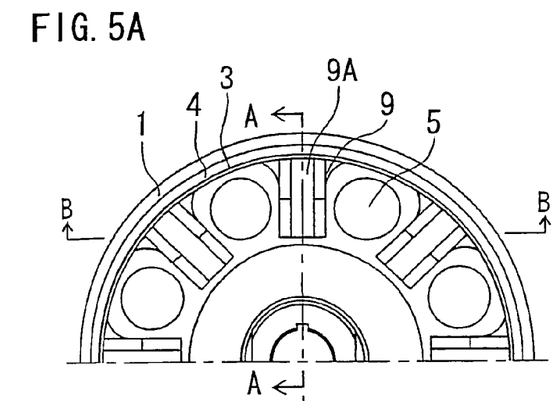
FIG. 5A is a fragmentary front view of a rotor of a permanent-magnet generator according to a second embodiment of the invention.
Figure 5B:
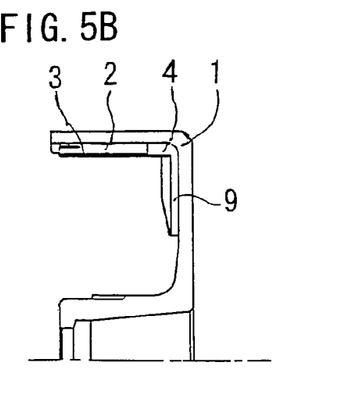
FIG. 5B is a fragmentary cross-sectional view of the rotor taken along lines A-A of FIG. 5A.
Figure 5C:
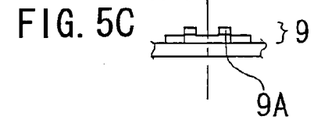
FIG. 5C is a fragmentary cross-sectional view of the rotor especially showing one of protrusions taken along lines B-B of FIG. 5A.
Figure 5D:
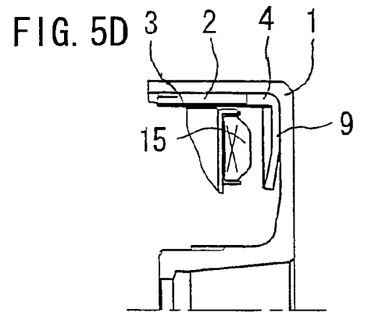
FIG. 5D is a fragmentary cross-sectional view of the rotor shown with an electricity-generating coil taken along lines A-A of FIG. 5A especially showing a situation in which the protrusion has deformed by heat.

FIG. 5A is a fragmentary front view of a rotor of a permanent-magnet generator according to a second embodiment of the invention, FIG. 5B is a fragmentary cross-sectional view of the rotor taken along lines A-A of FIG. 5A, FIG. 5C is a fragmentary cross-sectional view of the rotor taken along lines B-B of FIG. 5A especially showing one of protrusions 9, and FIG. 5D is a fragmentary cross-sectional view of the rotor shown with one of electricity-generating coils 15 taken along lines A-A of FIG. 5A especially showing a situation in which the protrusion 9 has deformed by heat.

As shown in FIGS. 5A, 5B and 5C, the rotor of this permanent-magnet generator includes a generally cup-shaped flywheel 1, a plurality of magnets 2, a cylindrical protective ring 3 and a resin layer 4. There are formed a plurality of air passages 5 in a bottom portion of the flywheel 1 and a plurality of protrusions 9 bulging inward from the bottom portion of the flywheel 1. The protrusions 9 are formed as integral parts of the resin layer 4 fixing the multiple magnets 2 and the protective ring 3 to the flywheel 1.

The rotor of the second embodiment has essentially the same structure as the first embodiment as described above. There is formed a radially extending recess 9A having a U-shaped cross section in a top surface of each of the protrusions 9 which are arranged along a circumferential direction of the flywheel 1. The structure of the second embodiment differs from that of the first embodiment in that the top surface of each protrusion 9 slopes in a radial direction of the flywheel 1 in such a way that the height of the top surface of each protrusion 9 decreases from the outside to the inside of the flywheel 1.

Generally, electricity-generating coils generate heat when a rotor of a permanent-magnet generator rotates. If the temperature inside the rotor excessively increases due to heat buildup, components within the rotor may be thermally damaged or adversely affected. In the structure of the first embodiment, for example, excess heat buildup inside the flywheel 1 may deform the protrusions 6, causing innermost ends of the protrusions 6 to lift from the bottom portion 1B of the flywheel 1, narrowing gaps between the protrusions 6 and the coils 8.

The structure of the permanent-magnet generator according to the second embodiment employing the protrusions 9 having the sloping top surfaces produces, in addition to the aforementioned advantages of the first embodiment, an advantage that, even when innermost ends of the protrusions 9 lift from the bottom portion of the flywheel 1 due to thermal deformation as shown in FIG. 5D, sufficient gaps are maintained between the protrusions 9 and the coils 15.

Third Embodiment

Figure 6A:
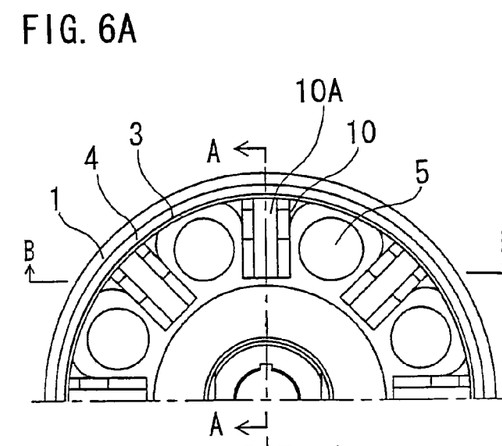
FIG. 6A is a fragmentary front view of a rotor of a permanent-magnet generator according to a third embodiment of the invention.
Figure 6B:
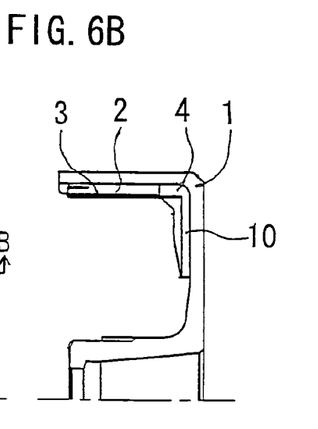
FIG. 6B is a fragmentary cross-sectional view of the rotor taken along lines A-A of FIG. 6A.
Figure 6C:
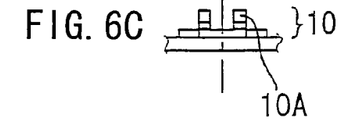
FIG. 6C is a fragmentary cross-sectional view of the rotor especially showing one of protrusions taken along lines B-B of FIG. 6A.

FIG. 6A is a fragmentary front view of a rotor of a permanent-magnet generator according to a third embodiment of the invention, FIG. 6B is a fragmentary cross-sectional view of the rotor taken along lines A-A of FIG. 6A, and FIG. 6C is a fragmentary cross-sectional view of the rotor taken along lines B-B of FIG. 6A especially showing one of protrusions 10.

As shown in FIGS. 6A, 6B and 6C, the rotor of this permanent-magnet generator includes a generally cup-shaped flywheel 1, a plurality of magnets 2, a cylindrical protective ring 3 and a resin layer 4. There are formed a plurality of air passages 5 in a bottom portion of the flywheel 1 and a plurality of protrusions 10 bulging inward from the bottom portion of the flywheel 1. The protrusions 10 are formed as integral parts of the resin layer 4 fixing the multiple magnets 2 and the protective ring 3 to the flywheel 1.

The rotor of the third embodiment has essentially the same structure as the first and second embodiments as described above. There is formed a radially extending recess 10A having a U-shaped cross section in a top surface of each protrusion 10. While most part of the top surface of each protrusion 10 slopes in a radial direction of the flywheel 1 as in the second embodiment, the height of the top surface of each protrusion 10 increases at an outer end portion thereof where each protrusion 10 connects to a ringlike portion of the flywheel 1 so that the outer end portion of each protrusion 10 is thicker than the other portion thereof.

The structure of the permanent-magnet generator according to the third embodiment in which the outer end portion of each protrusion 10 connecting to the ringlike portion of the flywheel 1 is thickened produces, in addition to the aforementioned advantages of the first and second embodiments, an advantage that the connecting outer end portion of each protrusion 10 is strengthened, increasing thereby overall strength of the individual protrusions 10. Since the strength of the protrusions 10 is increased in this way, it is possible to prevent the protrusions 10 from deforming due to the influence of heat generation in electricity-generating coils.

The structure of the third embodiment in which the connecting outer end portion of each protrusion 10 is thickened can also be applied to the protrusions 6 of the first embodiment, producing the same advantageous effect as mentioned above.

Fourth Embodiment

Figures 7A, 7C:
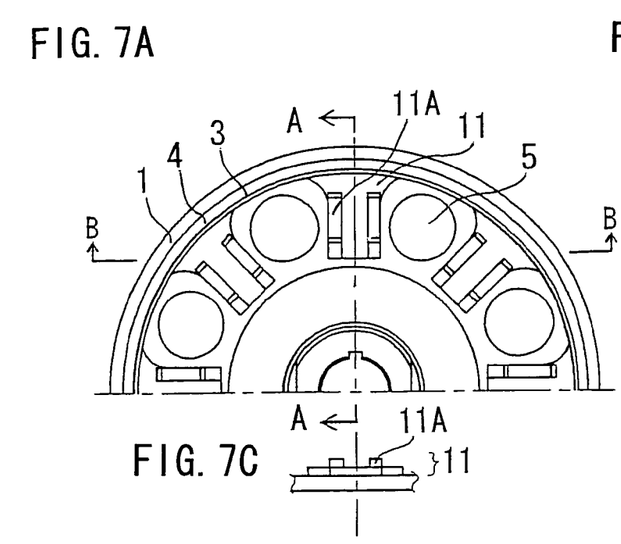
FIG. 7A is a fragmentary front view of a rotor of a permanent-magnet generator according to a fourth embodiment of the invention.
FIG. 7C is a fragmentary cross-sectional view of the rotor especially showing one of protrusions taken along lines B-B of FIG. 7A.
Figure 7B:
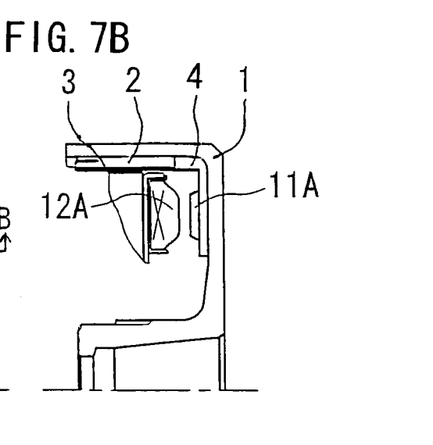
FIG. 7B is a fragmentary cross-sectional view of the rotor shown with an electricity-generating coil taken along lines A-A of FIG. 7A.

FIG. 7A is a fragmentary front view of a rotor of a permanent-magnet generator according to a fourth embodiment of the invention, FIG. 7B is a fragmentary cross-sectional view of the rotor shown with one of electricity-generating coils 12A taken along lines A-A of FIG. 7A, and FIG. 7C is a fragmentary cross-sectional view of the rotor taken along lines B-B of FIG. 7A especially showing one of protrusions 11.

As shown in FIGS. 7A, 7B and 7C, the rotor of this permanent-magnet generator includes a generally cup-shaped flywheel 1, a plurality of magnets 2, a cylindrical protective ring 3 and a resin layer 4. There are formed a plurality of air passages 5 in a bottom portion of the flywheel 1 and a plurality of protrusions 11 bulging inward from the bottom portion of the flywheel 1. The protrusions 11 are formed as integral parts of the resin layer 4 fixing the multiple magnets 2 and the protective ring 3 to the flywheel 1. The electricity-generating coils 12A are situated to face the rotor.

The rotor of the fourth embodiment has essentially the same structure as the first to third embodiments as described above. There is formed a radially extending recess 11A constituting an irregular surface portion having a U-shaped cross section in a top surface of each protrusion 11 such that the recesses 11A are situated against bulging winding portions of the individual electricity-generating coils 12A.

Figure 8:
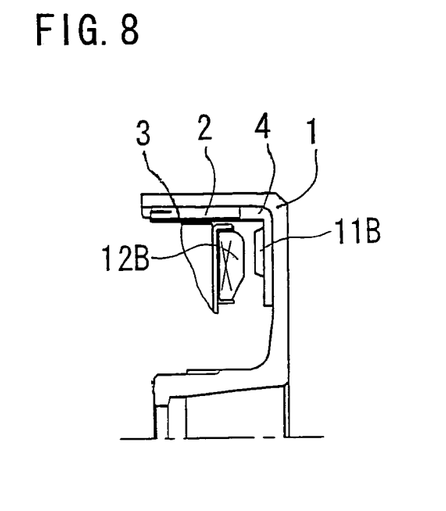
FIG. 8 is a fragmentary cross-sectional view of a rotor shown with an electricity-generating coil in one variation of the fourth embodiment corresponding to FIG. 7B.
Figure 9:
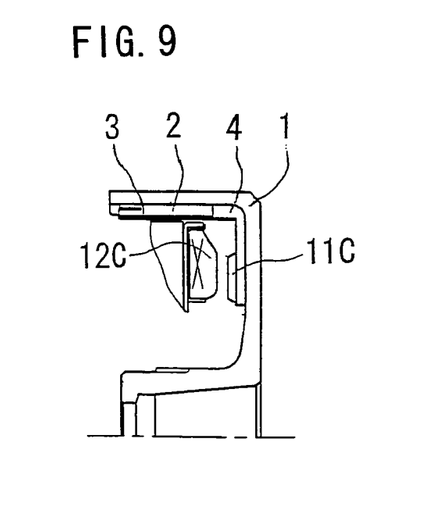
FIG. 9 is a fragmentary cross-sectional view of a rotor shown with an electricity-generating coil in another variation of the fourth embodiment corresponding to FIG. 7B.

While the bulging winding portion of each electricity-generating coil 12A is at a central part thereof as shown in FIG. 7B, the structure of the fourth embodiment may be modified as illustrated in FIGS. 8 and 9.

FIG. 8 is a fragmentary cross-sectional view of a rotor shown with one of electricity-generating coils 12B in one variation of the fourth embodiment corresponding to FIG. 7B, in which a bulging winding portion of each electricity-generating coil 12B and a recess 11B formed in each protrusion 11 are positioned radially outward in the flywheel 1, and FIG. 9 is a fragmentary cross-sectional view of a rotor shown with one of electricity-generating coils 12C in another variation of the fourth embodiment corresponding to FIG. 7B, in which a bulging winding portion of each electricity-generating coil 12C and a recess 11C formed in each protrusion 11 are positioned radially inward in the flywheel 1.

In the aforementioned permanent-magnet generator of the fourth embodiment and the variations thereof, the recesses 11A, 11B, 11C are positioned to face the bulging winding portions of the electricity-generating coils 12A, 12B, 12C, respectively. Consequently, the protrusions 11 with the recesses 11A, 11B, 11C formed therein stir up air masses especially around the bulging winding portions of the coils 12A, 12B, 12C with reduced resistance to air flows in areas other than the recesses 11A, 11B, 11C. It will therefore be appreciated that air around the electricity-generating coils 12A, 12B, 12C which generate heat is efficiently stirred up by the protrusions 11 with reduced energy loss when the flywheel 1 rotates.

The protrusions 11 of the fourth embodiment may be shaped like any of the irregular surface portions of the aforementioned first to third embodiments to produce the same advantages thereof. For example, a top surface of each of the protrusions 11 may be shaped to slope in a radial direction of the flywheel 1 or an outer end portion of each protrusion 11 may be made thicker.

Fifth Embodiment

While the protrusions 6, 9, 10, 11 are formed as integral parts of the resin layer 4 fixing the multiple magnets 2 and the protective ring 3 to the flywheel 1 in the first to fourth embodiments thus far described, protrusions may be formed separately from the resin layer 4 and fixed at specified positions.

Figures 10A, 10B:
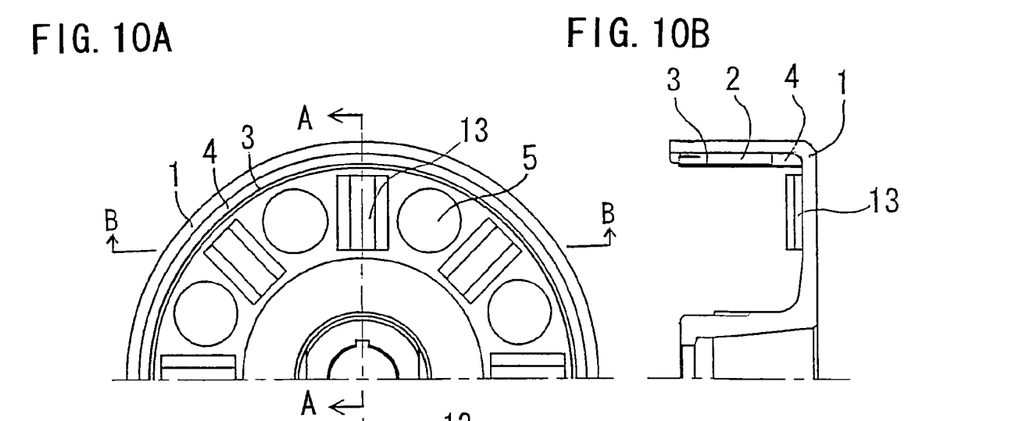
FIG. 10A is a fragmentary front view of a rotor of a permanent-magnet generator according to a fifth embodiment of the invention.
FIG. 10B is a fragmentary cross-sectional view of the rotor taken along lines A-A of FIG. 10A.
Figure 10C:
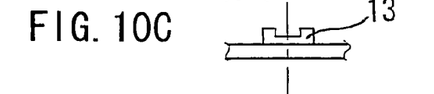
FIG. 10C is a fragmentary cross-sectional view of the rotor especially showing one of protrusions taken along lines B-B of FIG. 10A.

FIG. 10A is a fragmentary front view of a rotor of a permanent-magnet generator according to a fifth embodiment of the invention, FIG. 10B is a fragmentary cross-sectional view of the rotor taken along lines A-A of FIG. 10A, and FIG. 10C is a fragmentary cross-sectional view of the rotor taken along lines B-B of FIG. 10A especially showing one of protrusions 13.

As shown in FIGS. 10A, 10B and 10C, the rotor of this permanent-magnet generator includes a generally cup-shaped flywheel 1, a plurality of magnets 2, a cylindrical protective ring 3 and a resin layer 4. There are formed a plurality of air passages 5 in a bottom portion of the flywheel 1 and a plurality of protrusions 10 bulging inward from the bottom portion of the flywheel 1.

The rotor of the fifth embodiment has essentially the same structure as the first to fourth embodiments as described above. However, the protrusions 13 are not formed as integral parts of the resin layer 4 fixing the multiple magnets 2 and the protective ring 3 to the flywheel 1 but as separate parts independently of the resin layer 4 in this embodiment. The separately formed protrusions 13 are bonded to the bottom portion of the flywheel 1 at specified positions thereof using an adhesive agent, for instance. The protrusions 13 of the fifth embodiment may be shaped like any of the irregular surface portions of the foregoing first to fourth embodiments.

The structure of the permanent-magnet generator according to the fifth embodiment in which the protrusions 13 are formed as separate parts independently of the resin layer 4 produces, in addition to the aforementioned advantages of the first to fourth embodiments, an advantage that the resin layer 4 can be simplified in shape and technical restrictions imposed on the process of molding the resin layer 4 can be mitigated, leading to an eventual reduction in manufacturing cost. The separately formed protrusions 13 can be attached to the flywheel 1 at a later time whenever the need arises.

Figure 11:
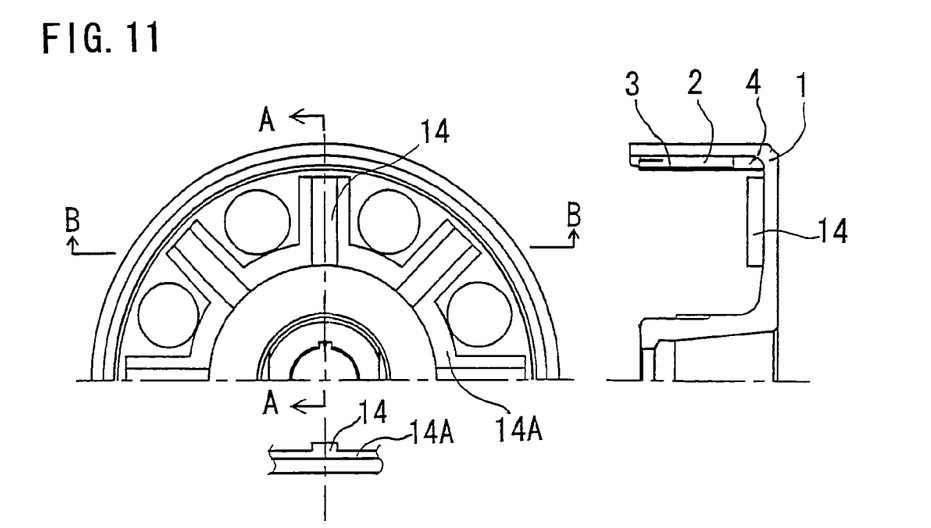
FIG. 11 shows a fragmentary front view, a fragmentary cross-sectional view taken along lines A-A and a fragmentary cross-sectional view taken along lines B-B of a rotor of a permanent-magnet generator in one variation of the fifth embodiment of the invention.

FIG. 11 shows a fragmentary front view, a fragmentary cross-sectional view taken along lines A-A and a fragmentary cross-sectional view taken along lines B-B of a rotor of a permanent-magnet generator in one variation of the fifth embodiment, in which a plurality of protrusions 14 are formed separately from the resin layer 4. Unlike the aforementioned protrusions 13, however, these protrusions 14 are formed on a single doughnut-shaped base 14A to project radially outward from specified positions thereof. In this variation of the fifth embodiment, the protrusions 14 are joined at inner end portions by the doughnut-shaped base 14A, together forming a single structure. This structure of the variation of the fifth embodiment is advantageous in reducing the number of components, yet producing the same advantages produced by the protrusions 13 shown in FIGS. 10A, 10B and 10C.

What is claimed is:

1. A permanent-magnet generator comprising:
   a flywheel having a ringlike portion and a bottom portion which closes off one end of the ringlike portion;
   a plurality of magnets arranged on an inside surface of the ringlike portion of said flywheel;
   a plurality of air passages formed in the bottom portion of said flywheel;
   a plurality of protrusions bulging inward from the bottom portion of said flywheel; and
   a coil disposed to face said magnets for generating electricity by virtue of electromagnetic induction caused by relative movement of said coil and said magnets;
   wherein an irregular surface portion is formed in each of said protrusions, said irregular surface portion being configured so as to create a turbulent air flow when said flywheel rotates, said irregular surface portion being irregularly shaped along a circumferential direction of said flywheel, and
   wherein the irregular surface portion of each of said protrusions comprises at least two steps on each side of said protrusions, in said circumferential direction of said flywheel, and
   wherein each respective protrusion is located in between two respective adjacent air passages.

2. The permanent-magnet generator according to claim 1, wherein a top surface of each of said protrusions slopes in a radial direction of said flywheel in such a way that the height of the top surface of each protrusion decreases from the outside to the inside of said flywheel.

3. The permanent-magnet generator according to claim 1, wherein each of said protrusions is thickened at an outer end portion thereof where each protrusion connects to the ringlike portion of said flywheel.

4. The permanent-magnet generator according to claim 1, wherein the irregular surface portion of each protrusion is situated against a conductor winding portion of said coil.

5. The permanent-magnet generator according to claim 1, wherein said protrusions are formed of resin material.

6. The permanent-magnet generator according to claim 1, wherein said protrusions constitute integral parts of a resin layer formed by filling resin material in areas around said plurality of magnets for fixing said magnets to said flywheel.

7. The permanent-magnet generator according to claim 1, wherein said protrusions are formed as at least one discrete component which is fixed to said flywheel.

8. The permanent-magnet generator according to claim 1, wherein each of said protrusions is formed of a base portion and at least one upper portion that is narrower in width than said base portion, in said circumferential direction of said flywheel, said at least one upper portion being substantially centered on said base portion, in said circumferential direction of said flywheel, such that said at least two steps are formed on each side of each of said protrusions.

* * * * *